United States Patent [19]

Scholes

[11] 4,118,202

[45] Oct. 3, 1978

[54] PRE-PRIMED FUEL AND METHOD AND APPARATUS FOR ITS MANUFACTURE

[75] Inventor: Addison B. Scholes, Muncie, Ind.

[73] Assignee: Ball Corporation, Muncie, Ind.

[21] Appl. No.: 842,731

[22] Filed: Oct. 17, 1977

[51] Int. Cl.$^2$ ............................ C10L 9/00; C10L 5/22
[52] U.S. Cl. .......................................... 44/6; 44/1 E; 44/2; 44/41
[58] Field of Search ............................ 44/2, 1 E, 6, 41

[56] References Cited

U.S. PATENT DOCUMENTS

| 349,463 | 9/1886 | Sparks | 44/6 |
|---|---|---|---|
| 2,290,790 | 7/1942 | Yeomans | 44/6 |

FOREIGN PATENT DOCUMENTS

| 2,598 of | 1881 | United Kingdom | 44/41 |
|---|---|---|---|
| 517,459 | 1/1940 | United Kingdom | 44/6 |
| 730,838 | 6/1955 | United Kingdom | 44/41 |

*Primary Examiner*—Carl Dees
*Attorney, Agent, or Firm*—David H. Badger; Gilbert E. Alberding

[57] ABSTRACT

A primed fuel is manufactured by the application of particles of a combustible primer, such as wax, to a fuel, such as charred wood. In the method and apparatus of this manufacture, fuel is transported through a deposition zone within the apparatus. A liquid supply of combustible primer is provided and formed into droplets and deposited in droplet form onto the fuel, preferably by electrostatic deposition. The primer tends to be preferentially deposited at the more readily ignitable edge of the fuel.

22 Claims, 5 Drawing Figures

PRE-PRIMED FUEL AND METHOD AND APPARATUS FOR ITS MANUFACTURE

This invention relates to a method of and apparatus for the manufacture of a pre-primed fuel and more particularly to a method and apparatus for applying a non-fluid primer material, such as wax, to a combustible fuel, such as charred wood, to produce novel pre-primed charred wood.

Prior patents disclosing manufactured combustible fuels and methods and apparatus used in their manufacture include U.S. Pat. No. 3,966,427; U.S. Pat. No. 3,635,684; U.S. Pat. No. 3,352,651; U.S. Pat. No. 3,346,352; U.S. Pat. No. 3,133,799; U.S. Pat. No. 3,655,350; U.S. Pat. No. 3,402,033; U.S. Pat. No. 3,356,469; U.S. Pat. No. 3,973,922; U.S. Pat. No. 3,791,802; U.S. Pat. No. 3,633,185; and U.S. Pat. No. 2,993,686. These patents disclose a variety of manufactured solid fuels and of processes and apparatus relating to such manufacture and suggest that spraying may be used as a step in such manufacture. For example, U.S. Pat. No. 3,356,469 discloses a coated fuel body and suggests that a coating including fly ash and wax may be applied to the charcoal briquettes by spraying.

WIth the invention, pre-primed fuel can be manufactured by applying to pieces of broken wood which have been charred, a non-fluid combustible primer material such as a hydrocarbon wax. Such pieces of wood can range in length from an inch to several inches and on the order of an inch or less in the dimensions transverse to length. By electrostatically applying the wax to the charred wood, it has a tendency to be preferentially deposited at the readily ignitible edges of the charred wood.

Apparatus for manufacturing the pre-primed fuel includes a structure forming a deposition chamber and a second means to deliver particles of primer material to the deposition chamber. Conveying means, adapted to support the fuel so substantially its entire surface is exposed to application of the primer, is used to carry the fuel to be primed through the deposition chamber. Means are provided within the deposition chamber to direct the particles of primer to the fuel from both above and below the conveying means. Such means can provide an electrostatic field to charge the particles of primer within the deposition chamber and urge the charged primer particles onto the fuel. With such means, the particles tend to be deposited at the edges of the fuel where the electrostatic field is more concentrated.

The lower portion of the deposition chamber is adapted to maintain a normally non-fluid primer material in a liquid pool by means of immersion heaters at the bottom of the tank. At the top of the deposition chamber, preferably within means forming an upper chamber, are the sprayers to which the liquefied primer material is provided. Heaters are also provided in the upper chamber in association with the sprayers to help maintain the normally non-fluid primer material in liquid form. Conveniently, the upper chamber can provide means for loading the non-fluid primer material into the apparatus, with the heaters in the upper chamber providing the energy to liquefy the non-fluid primer material in the upper chamber, and for directing the flow of liquefied primer into the tank below. Where electrostatic means are used to direct the particles of primer to the fuel, two sets of electrodes can be used within the deposition chamber, one above and one below the means conveying fuel through the deposition chamber. Particles of primer which have passed through the conveying means are directed toward the fuel from below by the electrostatic means.

In this invention and with this structure, the fuel to which the primer is to be applied is placed on the apparatus at a loading station and transported through the deposition zone. A liquid supply of combustible primer material is provided from a source of supply and formed into particles of primer directed at the fuel within the deposition chamber. The particles are electrically charged by creating ionization within the deposition chamber. The fuel is maintained at a spray attracting potential and the charged particles of combustible primer are deposited on the fuel. The deposition chamber is heated by the energy employed to liquefy, and to maintain liquefied, the primer material. Such heat contributes to the deposition of primer particles on the fuel.

Fuels like charred wood frequently provide fine pieces of charcoal and dust which can become integrated into the liquid supply of primer material. In such instances, the small passageways included in the means to break the primer material into a spray of particles can become blocked, but it has been found that if a means of vibration is provided where the passageways are small, flow can be maintained even though "fines" from the charred fuel are present. Preferably, therefore, such a step would be included in the method wherever there is concern about fine particles of fuel becoming incorporated into the liquid supply of primer material. It has likewise been found advantageous to pulse the pumped flow of liquid primer to prevent blocking such passageways.

The invention provides substantial advantage over the prior methods of manufacturing pre-primed fuels. The spray application of this invention provides substantial control over the amount of combustible primer material that can be applied to the fuel and permits the selective application to those portions of the charred wood most easily ignited. The ignitability of fuels therefore can be enhanced with lesser amounts of primer material than with prior methods. Where the combustible material was immersed in a primer such as wax, as common prior to this invention, a large amount of the wax was absorbed into the pores of the combustible material, resulting in the use of many times the amount of primer material than used with the invention. For example, with this invention, it is possible to obtain pre-primed fuel which is ignitable with as little as one-fourth of the primer material which would be used if the combustible materials were immersed in the primer material.

Wherever this specification refers to primer or primer material, it refers to a normally non-fluid material which is easily ignited and burns with a non-toxic residue, such as petrochemical waxes. Wherever this specification refers to fuel, it refers to combustible materials, for example, charred wood, charcoal briquettes, or other generally flameless fuels which are difficult to ignite without priming. Such fuels have sufficient electrical conductivity that they may be maintained at an electrical potential permitting the deposition of electrostatically charged particles of primer by contact with a grounded conveying means.

This invention's features are further illustrated in the following drawings, in which.

Figure 1:
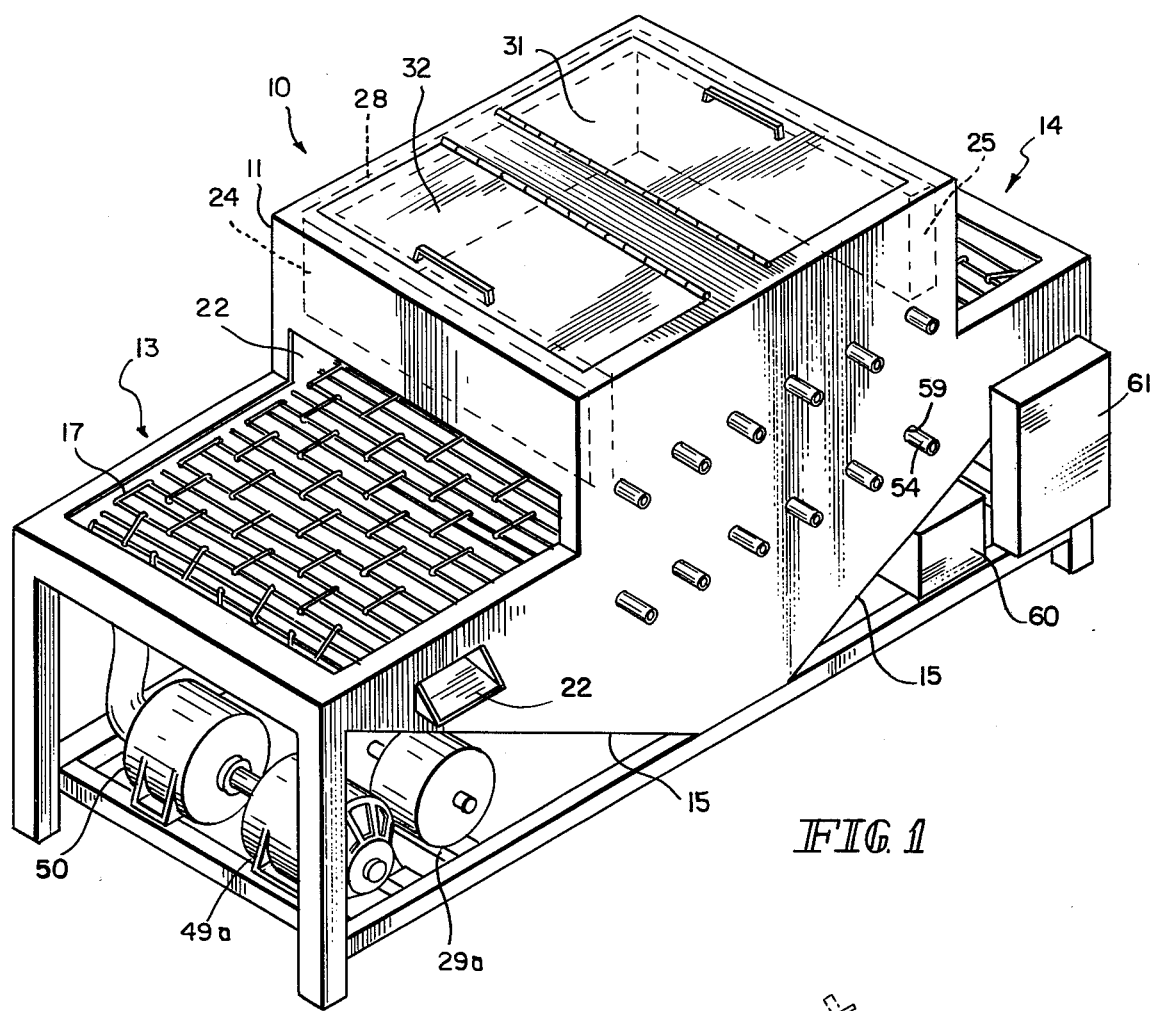
FIG. 1 is a perspective view of an apparatus of this invention.
Figure 2:
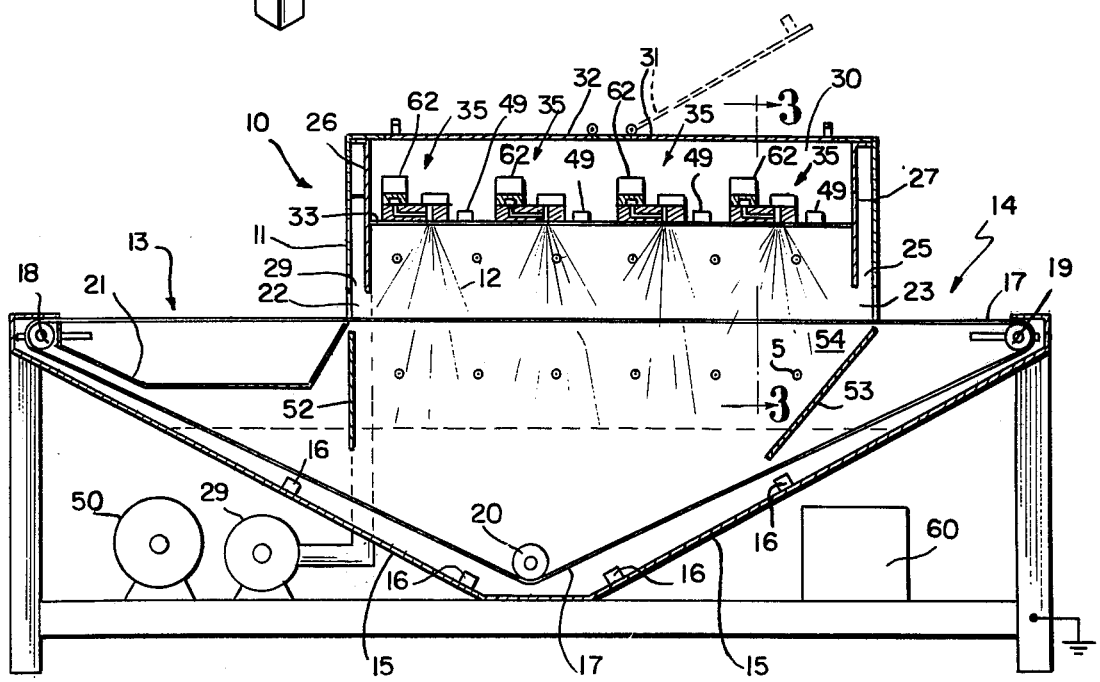
FIG. 2 is a cross-sectional view of the apparatus of FIG. 1, generally taken along its longitudinal center line.
Figure 3:
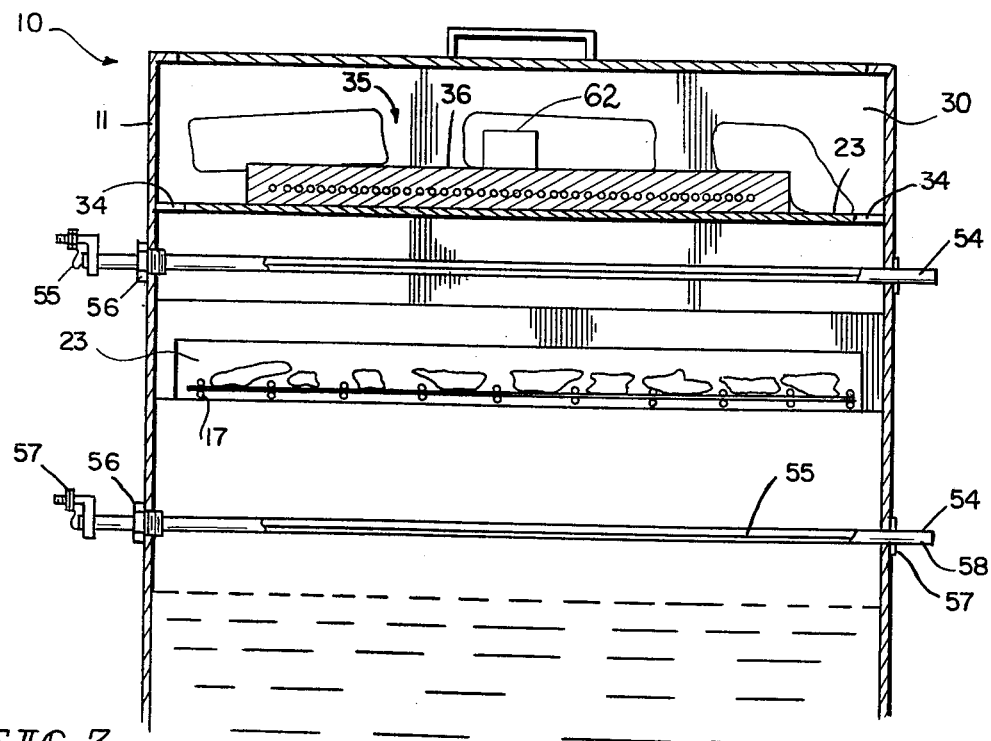
FIG. 3 is a vertical section of the apparatus of FIG. 1, taken transversely to the longitudinal axis of the apparatus along the line 3—3 as shown in FIG. 2.

Referring now to FIG. 1, the apparatus 10 includes the structure 11 forming a deposition chamber 12, as shown in FIGS. 2 and 3, within its interior and a loading station 13 and an unloading station 14 on its exterior. The structure 11 includes sloping bottom portions 15 to contain a supply of primer material in liquid form in the lower portion of the apparatus below the deposition chamber as shown in FIGS. 2 and 3. The lower container portion of the apparatus formed by sloping bottom portion 15 can include a plurality of electrical strip heaters 16 to maintain a normally non-fluid primer, such as wax, in a liquid state. The structure of the apparatus may be formed from steel plates by welding or other suitable joining means. Since it must support a substantial weight, the steel plate from which it is formed should have substantial thickness, for example, on the order of ⅛ of an inch, and when formed, provide a solid base for the apparatus.

Figure 5:
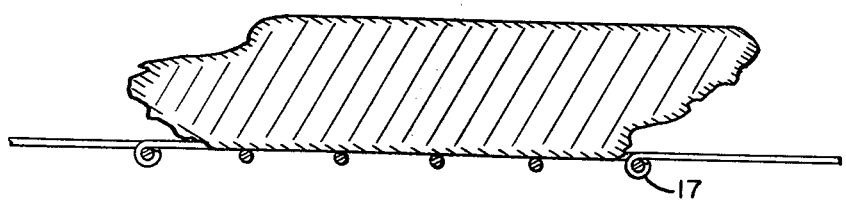
FIG. 5 is a cross-sectional view of the pre-primed charred wood manufactured with this invention.

The apparatus includes a conveyor 17 adapted to carry pieces of fuel to which the primer is to be applied through the deposition chamber 12. The conveyor may be formed from a wire mesh including a plurality of wires extending transversely across the width of the apparatus at intervals of ½ inch and interconnected by wire links pivotally attached to the adjoining wires at intervals of 4 inches across the width of the apparatus. The flexible wire mesh conveyor thus formed has a plurality of openings having dimensions of approximately ½ inch by 4 inches. Such a conveyor provides unobstructing support for the fuel because of its substantial open character, with substantially the entire surface of the fuel being available for the application of primer material within the deposition chamber, as shown in FIG. 5.

As shown in FIG. 2, the conveyor 17 is driven by means (not shown) around sprockets 18 and 19 supported by the structure of the apparatus and around an idler sprocket 20 in the lower container portion of the apparatus. The sprockets 18 and 19 can be carried on sliding supports to adjust the tension on the conveyor between the sprockets. The conveyor 17 is driven to travel from the loading station 13 through the deposition chamber 12 within the apparatus past the unloading station 14 and through the lower container portion of the apparatus. By this means, excess accumulations of primer material on the conveyor are controlled by removal of such excess during transit of the conveyor 17 through the liquid pool of primer material in the lower container portion of the apparatus. In addition, where a primer material is a liquefied wax-like material providing lubricating qualities, the lengths of the mesh conveyor are somewhat lubricated and protected from corrosion by the residue of wax they carry from the pool.

Below the portion of the apparatus forming the loading station 13 is a trough 21, as shown in FIG. 2, to collect small pieces of fuel and "fines" which may be present on such material. Such small pieces and fines fall through the openings of the container 17 into the trough 21 as the apparatus is being loaded and drop from chute 22, shown in FIG. 1.

At the openings 22 and 23 of the apparatus (FIG. 2) which form, respectively, the entrance and exit to the deposition chamber 12, air traps 24 and 25 are provided to prevent the escape of finely divided particles of primer material from within the deposition chamber to the exterior of the apparatus. Such air traps are formed by walls 26 and 27 within the structure of the apparatus adjacent the entrance and exit openings 22 and 23, respectively, to form an interior ductwork 28 shown in phantom lines in FIG. 1 connected with a blower 29 as shown in FIG. 2. The air exhaust from the traps 24 and 25 is filtered within the apparatus to trap any primer material carried by the air exhaust before it reaches the blower 29. The means for filtering the primer material from the exhaust air is not shown, but any means known in the art for removing spray particles from air may be used.

As shown in FIGS. 2 and 3, the apparatus includes an upper chamber 30 and includes hinged lids 31 and 32 to permit access to the upper chamber. A transverse wall 33 forms the floor of the upper chamber and the top of the deposition chamber. The wall 33 provides an opening or openings 34 as shown in FIG. 3. The openings 34 permit communication between the upper chamber 30 and the lower container portion of the apparatus, and are thus useful in a manner to be described. Mounted on the upper wall 33 are a plurality of means 35 to form liquefied primer material into particles directed into the deposition chamber 12. In the apparatus shown, four such means are included, each such means providing 42 atomizers or sprayers to form the liquid primer material into particle form. With the resulting total of 168 atomizers, it is possible to break into particulate form, for example, 360 pounds of molten wax in each hour of operation.

Figure 4:
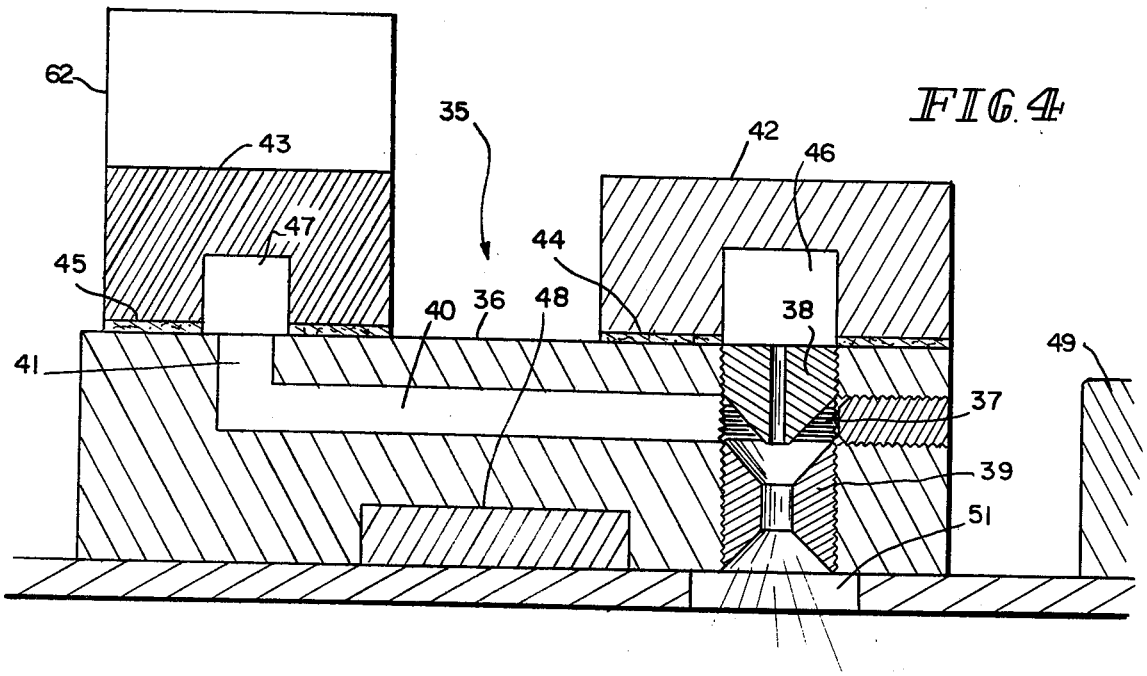
FIG. 4 is an enlarged cross-sectional view of the structure of the means to form particles of primer material.

An enlarged cross-sectional view of one of such means 35 taken through one of its atomizers is shown in FIG. 4. Such a means can be formed from an aluminum block 36 approximately 6 inches in width, 2 inches high, and 38 inches long, having equal spaced across its extent 42 threaded bores 37. Each threaded bore 37 includes a nozzle forming member 38 and an atomizing orifice forming member 39. Additional passageways 40 and 41 are drilled in the block in communication with each bore 37. Mounted on top of plate 36 are a manifold for air 42 and a manifold for primer material 43. The manifolds are each sealed at the surface of the block by gaskets 44 and 45, respectively. The air manifold 42 forms a passageway 46 in communication with the atomizer formed by nozzle member 38 and atomizing orifice forming member 39 and with the other corresponding atomizers carried by block 36. The primer manifold 43 forms a passageway 47 communicating with the passageways 41 and 40 to carry the primer material to the bores 37. The block 36 includes a cavity carrying a heating means 48 in its central portion adjacent each of the atomizers and passageways carrying primer material to the atomizers as shown in FIG. 4.

In addition to the four means 35 within the upper, four additional electric strip heaters 49 are attached to wall 33 adjacent the side of each means 35 carrying the atomizers. Heaters 49 provide additional heat to maintain the fluidity of the primer material as it is being formed into particles. An additional advantage of heaters 48 and 49 in the upper chamber is that in conjunction with the openings 34 in wall 33 and the hinged lids 31 and 32 they permit the upper chamber 30 to provide a convenient means to load solid meltable primer materials, such as wax, into the apparatus. Such wax, as shown in FIG. 3, is melted by the heat provided by heaters 48 and 49 and flows through openings 34, past the edge of conveyor 17 into the liquid primer material in the container portion of the apparatus.

In operation, liquid primer material is pumped from the lower container portion of the apparatus to the passageway 47 of primer manifold 43 of each of the means 35 and is carried from passageway 47 through the ducts 41 and 40 to each atomizer in the bores 37. A centrifugal pump and motor (not shown) carried by the structure provide the motive power to supply the liquid primer material to each of the means 35 carried within the upper chamber 30 of the apparatus. Air from a compressor 50, shown in FIGS. 1 and 2, is delivered to the passageway 46 of air manifold 42 and is formed into a high velocity jet by the bore of nozzle forming means 38 and directed through the atomizing orifice of member 39. The interaction of the jet of compressed air with the liquid primer material delivered to bore 37 forms a liquid primer material into a spray of particles directed from atomizing orifice forming means 39 into the deposition chamber 12 through holes 51 formed in wall 33. Heating means 48 assists in the formation of spray particles by providing heat to block 36 to maintain the fluidity of the liquid primer material as it is being formed into particles. In addition, each of the means 35 may have mechanically attached to it a vibrator 62 providing, for example, 7200 cycles per minute of vertical motion from less than 10 watts of power imput. Such a vibrator is Automatic Devices Inc. of Fairview, Pa, Model 222 Electromagnetic Inertial Vibrator.

As shown in FIG. 2, particles thus formed are provided within the deposition chamber 12 within the apparatus. The structure of the apparatus provides baffles 52 and 53 extending from below the path of travel a conveyor 17 to below the normal level of the liquid primer material within the apparatus. Spray particles thus formed are maintained within the deposition chamber by walls 26, 33, and 27 and baffles 52 and 53 and the pool of primer material forming the bottom of the deposition chamber. Particles not applied to the fuel conveyed to the deposition chamber on belt 17 become a part of the supply of liquid primer material.

Means are provided within the deposition chamber to direct the particles of primer material to all surfaces of the fuel to which it is to be applied. Such means, as shown in FIGS. 2 and 3, can include a plurality of electrode means connected with a source of high electric potential to provide ionization within the deposition chamber to charge the particles of primer material. The structure of the apparatus 10 is grounded, as indicated in FIG. 2, and the wire mesh conveyor 17 is thus maintained at ground potential. The fuel to which the primer material is to be applied is maintained at a spray attracting potential by its contact with the grounded conveyor and its slight electrical conductivity, and particles which are carried beyond conveyor 17 by the air used to atomize the primer material are urged from below the conveyor to deposition on the fuel through the openings in the conveyor 17. Heat within the deposition chamber from the heaters 48 and 49 in the upper chamber and heaters 61 in the lower container tends to assist such deposition.

Each electrode 54 can be comprised of a small steel wire 55 having, for example, a diameter on the order of 0.009 inches, carried within a ceramic tube that extends transversely across the entire width of the apparatus 10. The electrode 54 is shown in FIG. 3 in partial cross section to show its structure. The ceramic electrode carrier includes at one end a threaded bushing 56 and a clamp 57 to fasten the wire electrode to the carrier 54 and to provide means for an electrical connection between the source of high potential and the electrodes. At the other end of the carrier tube, the electrode wire 55 is fastened to the end of a plastic block 58 that is retained within this end of the ceramic tube and provides electrical isolation between the exterior of the apparatus and the charged wire electrode. This electrode arrangement provides protection for the fine wire electrode within the apparatus and provides a replaceable electrode structure. The electrodes 54 are placed in the apparatus by inserting them through a series of holes 59 provided on one side of the structure of the apparatus, as shown in FIGS. 1 and 3, and threading the threaded bushing 56 into corresponding threaded holes at the opposite side of the structure of the apparatus. High voltage supplies 60 are connected to the electrode wires 55 at the connection means 57. This connection is made by high voltage cables running between the high voltage supplies 60 and each of the connection means 57. Once these connections are made, the connections may be protected from contact by an insulative protective cover (which is not shown).

In the apparatus shown, six high voltage electrodes are evenly spaced 5 inches above the grounded conveyor on about 12-inch centers and six such electrodes are likewise evenly spaced about 3½ inches below the belt on about 12-inch centers. Two high voltage supplies are used to charge the electrodes, one high voltage supply being connected to the six electrodes above the conveyor and a second high voltage supply being connected to the six electrodes below the conveyor. The high voltage supplies are capable of providing on the order of 50 kilovolts d.c. at 1.5 milliamps of current. This voltage is typically provided in unfiltered half-wave rectified form.

The structure of the apparatus also carries a control 61 to permit adjustment of the operation of the air compressor, the primer material pump, the speed of the conveyor, and the voltage applied to the electrodes of the apparatus.

Where fine pieces of fuel become integrated into the liquid supply of primer material and may block the small passageways of the spray means, pulsation of the flow of primer material, in addition to vibration of such passageways, may be used to maintain the flow of primer material to the spray means. For example, the centrifugal pump can be activated for 55 seconds and deactivated for 5 seconds of each minute of operation. Sufficient energy is stored in the systems that spraying continues during the 5 second deactivation of the pump, and such operation is effective to maintain flow in the presence of such fine pieces of fuel.

In operation, fuel, such as charred pieces of wood, including pieces having typical sizes approximately 182 of an inch square by 4 inches in length, approximately 1 inch square by 3 inches in length, and approximately 1½ inches square by 3½ inches in length, but including many smaller and larger pieces, are loaded upon the apparatus at loading station 13. They are carried into and through the deposition chamber 12 in approximately 6 seconds, travelling at a rate of approximately 1 foot per second. The apparatus contains a petrochemical wax sold by Exxon Corporation under their name "Slackwax 3564". This wax has a melting point of 128° F. and is liquefied for application to the fuel. The molten wax is broken into particles by compressed air and directed into the deposition chamber from above the conveyor at a rate of approximately 6 pounds per minute from 168 atomizers arranged in four groups of 42 atomizers each, equally spaced at the top of the deposition chamber along the path of travel of the fuel. The 12 electrodes within the deposition chamber are provided with 50 kilovolts d.c. In this arrangement, wax can be applied to charred wood at a rate approximating 0.07 grams per square inch of exposed area of the charred wood.

In another example of the method of this invention, pieces of charred wood ranging in rough size from 1 inch to 4 inches were distributed on an open mesh conveyor of stainless steel having openings ⅜ of an inch square. The belt was constructed from wire 0.050 inch in diameter. Eight electrode wires, each 0.009 inch in diameter, were equally spaced 3 inches apart with four electrodes above and four below the conveyor. The four electrodes above the belt were spaced approximately 4 inches above the belt and the four electrodes below the belt were spaced approximately 3 inches below the belt. The electrodes were connected to a source of 30 kilovolts d.c. negative. Deposition took place within a chamber about 15 inches in length and about 12 inches in height with the conveyor passing through its center. Molten wax was delivered into the deposition chamber in particle form from 12 atomizers evenly spaced at the top of the deposition chamber. Wax particles were delivered into the deposition chamber equally from the atomizers at a rate of 0.3 to 0.4 pounds per minute. The pieces of charred wood were passed through the enclosures in about 5 seconds. The chart below presents the results on typical pieces of charred wood:

|     | Piece Size (inches) | Weight Before Waxing (grams) | Weight After Waxing (grams) | Weight Gain (grams) | Weight Gain per Square Inch (grams/in.²) |
| --- | --- | --- | --- | --- | --- |
| (1) | ⅜ × ⅜ 4 | 7.486 | 7.710 | 0.224 | .07 |
| (2) | 1 × 1 × 3⅝ | 16.800 | 17.061 | 0.261 | .07 |
| (3) | 1½ × 1½ × 3½ | 22.751 | 23.103 | 0.352 | .07 |

The apparatus shown and described in this specification is typically 12 feet in length, 6 feet in height, and approximately 4 feet in width. The deposition chamber formed within the apparatus is approximately 6 feet in length and 3 feet in width and depth. The apparatus forms loading and unloading stations located approximately 4 feet above the base of the structure, with the loading station being preferably 4 feet in length and the unloading station approximately 2 feet in length. In this configuration, the lower container portion of the apparatus will hold approximately 1,000 pounds of liquefied wax material. Such an apparatus using the method of this invention is capable of manufacturing 7,200 pounds per hour of primed charred wood. The apparatus, however, can be built in different sizes and configurations and my method may be used to accomodate different production requirements without departing from the scope of my invention as disclosed in the following claims.

I claim:

1. Apparatus for manufacturing pre-primed fuel with a normally non-fluid combustible primer comprising
   first means forming an upper chamber and a deposition chamber;
   second means to carry the fuel to be primed through the deposition chamber, said second means being adapted to support the fuel so that substantially the entire surface is exposed to deposition;
   third means to provide particles of liquid primer material to the deposition chamber located in the upper chamber of the first means;
   fourth means within the deposition chamber to direct particles of primer at the fuel from above and below the second means;
   the lower portion of the first means being adapted to intercept undeposited particles of primer, to maintain the normally non-fluid primer above its melting point and to provide a source of liquefied non-fluid primer to the third means, heating means being located at the upper chamber and in association with the third means.

2. Apparatus as set forth in claim 1 wherein the upper chamber is formed by a wall in said first means between the upper chamber and the deposition chamber, said wall carrying the third means and heating means and including an opening in communication with the lower portion of the first means so that non-fluid primer placed in the upper chamber will be liquefied and flow to the lower portion of the first means.

3. Apparatus as set forth in claim 1 wherein the third means forms atomizers and includes small passageways that carry the primer, and has mechanically attached means to vibrate mechanically the small passageways.

4. Apparatus for manufacturing pre-primed fuel comprising
   first means forming a deposition chamber and a container for primer material to be applied to said fuel;
   second means providing a liquid supply of primer material from said container for application to said fuel;
   third means to provide the liquid primer material as a spray in the deposition chamber;
   fourth means to charge electrostatically the spray of primer material for deposition in the chamber; and
   fifth means forming an unobstructing conveyor to carry the fuel into and through the deposition chamber through opening in the first means and to maintain the fuel a spray-attracting potential.

5. Apparatus as set forth in claim 4 wherein the container for primer material forms the lower portion of the deposition chamber, and includes heaters adapted to maintain a normally non-fluid primer material in a liquid pool, the third means provides the spray of primer from adjacent the top of the deposition chamber, and directs the spray in the direction of the liquid pool of primer material, and the fifth means carries the fuel between the third means and the liquid pool.

6. Apparatus as set forth in claim 5 wherein the fourth means comprises two sets of fine wires within the deposition chamber, one set arranged between the third means and the fifth means and the second set between the fifth means and the liquid pool.

7. Apparatus as set forth in claim 5 wherein the first means includes two baffles extending from under the fifth means into the liquid pool to form two ends of the deposition chamber below the fifth means and includes two exhaust manifolds at the openings of the deposition chamber for entrance and exit of the fifth means.

8. Apparatus as set forth in claim 5 wherein the fifth means is an endless belt consisting of wire links and passing through the liquid pool.

9. Apparatus as set forth in claim 4 wherein the first means includes an upper wall forming a melting chamber above the deposition chamber, the third means are arranged at the upper wall and are provided with heaters to maintain the third means and upper wall at an elevated temperature, and the upper wall is adapted so that normally non-fluid primer material may be placed in the melting chamber melted for flow under the influence of gravity to the container.

10. Apparatus as set forth in claim 4 wherein a vibrator is attached to the third means.

11. Apparatus for manufacturing pre-primed fuels comprising
first means forming a deposition chamber;
second means to provide particles of liquid primer material to the deposition chamber;
third means to convey fuel to be primed through the deposition chamber;
fourth means within the deposition chamber to direct the particles to the fuel, from above and below the second means, said third means being adapted to support the combustible materials so that substantially the entire surface of the fuel is exposed in deposition;
the lower portion of the first means being adapted to intercept and provide a supply of primer material.

12. Apparatus to coat fuel with a normally non-fluid primer comprising
a structure forming a deposition chamber in its interior having entrance and exit openings and forming on its exterior stations for loading the apparatus with fuel to be coated and for unloading coated fuel, said deposition chamber including a container at its lower portion for liquefied primer;
an unobstructing conveyor supported by said structure so that the conveyor can be driven through the loading station, the deposition chamber, the unloading station, and the container;
a heater in the lower container portion of the structure to liquefy and maintain the primer in a liquid state;
means to break the liquefied primer into particles and a system to deliver the liquefied primer from the lower container portion of the structure to said means; and
means within the structure to deposit the primer spray on the charred wood from above and below the conveyor.

13. Apparatus as set forth in claim 12 wherein the structure includes baffles extending from under the unobstructing conveyor into container portions of the structure and includes two exhaust manifolds at the openings of the structure for entrance and exit of the conveyor into the deposition chamber.

14. Apparatus as set forth in claim 12 above wherein the structure includes a trough under the loading station to collect small particles from the fuel to be primed.

15. A method of manufacturing charred combustible fuel primed with combustible primer comprising
transporting the fuel through a deposition zone;
providng a liquid supply of combustible primer;
forming droplets of combustible primer from the liquid supply and electrically charging the droplets at the deposition zone; and
maintaining the charred combustible material at a spray attracting potential while in the deposition zone so that the charged droplets of combustible primer are deposited on the materials.

16. The method as set forth in claim 15 wherein the deposition zone is maintained at an elevated temperature.

17. The method as set forth in claim 15 wherein the combustible primer is non-fluid at room temperature and is heated to liquefy it for the formation of droplets adjacent the deposition zone, said heat being used to elevate the temperature of the deposition zone.

18. A method of applying a primer material to a charred wood fuel comprising providing a liquid supply of the primer material which can include particles of the fuel, delivering the liquid primer material for atomization and deposition on the fuel through means defining a small passageway, and vibrating the means defining a small passageway in the presence of said liquid primer material to maintain the flow of liquid primer material for delivery, atomization, and deposition.

19. Pre-primed charred wood comprising a piece of broken wood which has been charred and is several inches in length, and on the order of an inch or less in those dimensions transverse to its length, having applied to its exterior a non-fluid combustible primer material by the steps of electrostatically charging and depositing particles of the non-fluid primer.

20. Apparatus for manufacturing pre-primed fuels comprising
first means forming a deposition chamber;
second means to provide particles of liquid primer material to the deposition chamber, including a block having a plurality of atomizers formed by a plurality of bores in said block, each bore including a nozzle forming member and an atomizing orifice forming member and being connected with a supply of liquid primer and a supply of compressed air;
third means to convey fuel to be primed through the deposition chamber; and
fourth means within the deposition chamber to direct the particles to the fuel, from above and below the second means, said third means being adapted to support the combustible materials so that substantially the entire surface of the fuel is exposed to deposition.

21. Apparatus as set forth in claim 20 wherein the block includes heating means adjacent the atomizers.

22. A method of applying a primer material to a fuel comprising providing a liquid supply of the primer material which can include particles of the fuel, delivering the liquid primer material for atomization and deposition on the fuel through means defining a small passageway, and vibrating the means defining a small passageway in the presence of said liquid primer material and pulsing the delivery of liquid primer material to maintain the flow of liquid primer material for delivery, atomization, and deposition.

* * * * *